(12) United States Patent
Vuopala et al.

(10) Patent No.: US 7,340,004 B2
(45) Date of Patent: Mar. 4, 2008

(54) METHOD AND ARRANGEMENT FOR LIMITING SIGNAL IN RADIO TRANSMITTER

(75) Inventors: Tapio Vuopala, Haukipudas (FI); Olli Piirainen, Oulu (FI)

(73) Assignee: Nokia Corporation, Espoo (FI)

( * ) Notice: Subject to any disclaimer, the term of this patent is extended or adjusted under 35 U.S.C. 154(b) by 454 days.

(21) Appl. No.: 10/493,396

(22) PCT Filed: Oct. 23, 2002

(86) PCT No.: PCT/FI02/00826

§ 371 (c)(1),
(2), (4) Date: Apr. 22, 2004

(87) PCT Pub. No.: WO03/036897

PCT Pub. Date: May 1, 2003

(65) Prior Publication Data

US 2004/0258175 A1 Dec. 23, 2004

(30) Foreign Application Priority Data

Oct. 24, 2001 (FI) .................................. 20012059

(51) Int. Cl.
*H04L 27/00* (2006.01)
(52) U.S. Cl. ....................... 375/295; 375/146; 375/296; 375/297
(58) Field of Classification Search ................ 375/295, 375/296, 284, 355, 297, 146; 455/522; 370/210, 370/320
See application file for complete search history.

(56) References Cited

U.S. PATENT DOCUMENTS

| 5,287,387 | A |   | 2/1994  | Birchler |
|---|---|---|---|---|
| 5,490,172 | A |   | 2/1996  | Komara |
| 5,638,403 | A | * | 6/1997  | Birchler et al. ............. 375/296 |
| 5,696,794 | A | * | 12/1997 | O'Dea ........................ 375/296 |
| 5,978,421 | A |   | 11/1999 | Shoji |
| 6,175,551 | B1 | * | 1/2001 | Awater et al. ............... 370/210 |
| 6,236,864 | B1 | * | 5/2001 | McGowan et al. ......... 455/522 |
| 6,298,094 | B1 |   | 10/2001 | Dehner et al. |
| 6,366,570 | B1 | * | 4/2002 | Bhagalia ...................... 370/342 |
| 6,529,560 | B1 | * | 3/2003 | Creighton ................... 375/284 |

FOREIGN PATENT DOCUMENTS

| EP | 0 977 355 A2 | 2/2000 |
|---|---|---|
| WO | WO 00/46956 | 8/2000 |

* cited by examiner

*Primary Examiner*—Mohammed Ghayour
*Assistant Examiner*—Sonia J King
(74) *Attorney, Agent, or Firm*—Squire Sanders & Dempsey L.L.P.

(57) ABSTRACT

A method for limiting a signal in a radio transmitter comprises giving a signal a limiting threshold, taking at least two samples from the signal for obtaining sample values, adding one or more sample values between the obtained first and at least one subsequent sample values, searching for sample values exceeding the limiting threshold, and if at least one sample value exceeding the limiting threshold is found determining limiting coefficients for a predetermined number of sample values by means of the at least one sample value exceeding the limiting threshold, and limiting the signal by one or more determined coefficients.

41 Claims, 7 Drawing Sheets

METHOD AND ARRANGEMENT FOR LIMITING SIGNAL IN RADIO TRANSMITTER

FIELD OF THE INVENTION

The invention relates to a method and an arrangement for limiting power and amplitude values of a signal in a radio transmitter.

BACKGROUND OF THE INVENTION

In several data transmission systems linearity of a power amplifier limits the achievable maximum transmission power, in particular, when a transmitted signal has a high peak-to-mean ratio. Thus, a signal to be applied to a power amplifier may momentarily show high power or amplitude values, which have to be taken into account in designing the power amplifier. In practice, this means that the amplifier input signal is to be scaled to a lower power or amplitude level for meeting the spectrum requirements of the data transmission system employed. This method, which is known as back-off, provides that the amplified signal is located in an area, where the amplifier transmission function is more linear. However, there is a problem that the back-off lowers the performance of the amplifier and/or the transmitter. On the other hand, the power amplifiers having a wide linear working range, are expensive and their performance is relatively poor.

Methods, by which signal power peaks are clipped, have also been developed. In one prior art clipping method, the power or amplitude values of a signal are given a threshold, and signal sections exceeding said threshold are clipped such that the threshold value is set to be the amplitude or the power and otherwise the signal values are not changed. However, this clipping method has a disadvantage that the frequency spectrum of the signal spreads out, in general, the spectrum spreads outside the assigned frequency band and thus causes interference to other users. The clipping methods generally have a drawback that they can only clip one signal at a time, and therefore they are poorly applicable to multi-carrier systems.

BRIEF DESCRIPTION OF THE INVENTION

An object of the invention is to provide a method and an apparatus implementing the method such that power or amplitude peaks of a signal can be limited. This is achieved by a method for limiting a signal in a radio transmitter. The method according to the invention comprises giving a signal a limiting threshold, taking at least two samples from the signal for obtaining sample values, adding one or more sample values between the obtained first and at least one subsequent sample values, searching for sample values exceeding the limiting threshold, and if at least one sample value exceeding the limiting threshold is found determining limiting coefficients or reducing coefficients for a predetermined number of sample values by means of the at least one sample value exceeding the limiting threshold, limiting the signal by means of one or more determined coefficients.

The invention also relates to an arrangement for limiting a signal. The arrangement according to the invention comprises means for giving the signal a limiting threshold, means for sampling the signal at least twice for obtaining sample values, means for adding one or more sample values between the obtained first and at least one subsequent sample values, means for searching for sample values exceeding the limiting threshold, means for determining limiting coefficients or reducing coefficients for a predetermined number of sample values by means of the at least one sample value exceeding the limiting threshold, means for limiting the signal by means of one or more determined coefficients.

The preferred embodiments of the invention are disclosed in the dependent claims.

The invention is based on the idea that, if necessary, the power and amplitude values of the processed signal are limited by means of determined limiting coefficients or reducing coefficients.

Several advantages are achieved by the method and arrangement according to the invention. In general, clipping the power or amplitude values of the signal in accordance with the invention does not spread the spectrum. Hence, the clipping of the signal by the method according to the invention causes less interference to other users in the system. In addition, thanks to improved power amplifier performance it is possible to save on transmission power consumption. The method according to the invention also allows clipping a plurality of signals at the same time. Hence, the method can be applied to limiting a multi-carrier signal, in particular.

BRIEF DESCRIPTION OF THE DRAWINGS

In the following, the invention will be described in connection with preferred embodiments, with reference to the attached drawings, wherein.

DESCRIPTION OF THE EMBODIMENTS

The solution of the invention is particularly well suited for a WCDMA (Wide Band Code Division Multiple Access) radio system employing direct sequence (DS) technology. Other applications include, for instance, satellite systems, military telecommunications systems and private, non-cellular networks. The solution of the invention is not restricted to them, however.

In the following example, preferred embodiments of the invention are described in a UMTS system (Universal Mobile Telephone System) without restricting the invention thereto, however.

Figure 1:
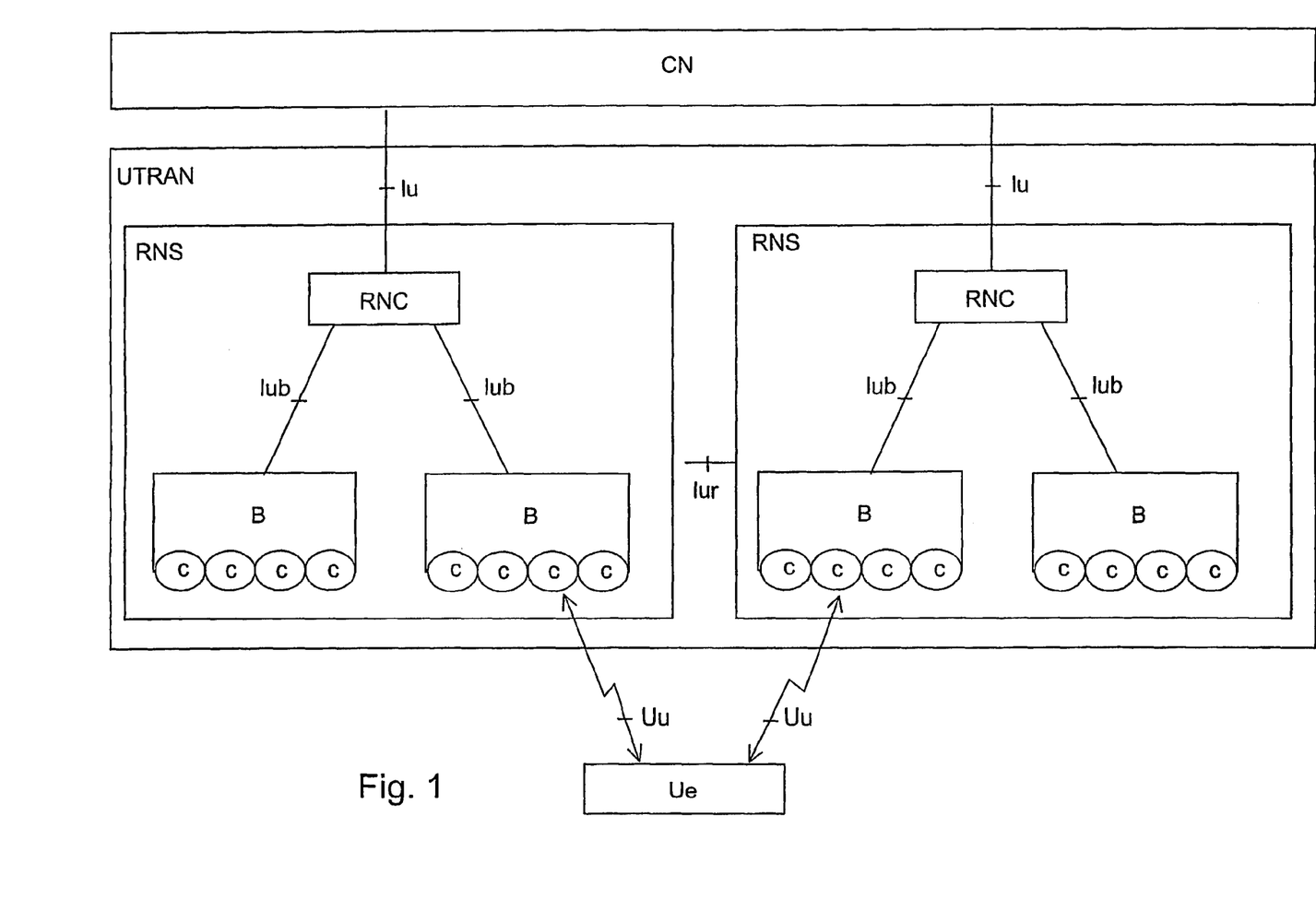
FIG. 1 is an example of a telecommunications system.

With reference to FIG. 1, a structure of a mobile telephone system is described by way of example. The main parts of the mobile telephone system include a core network CN, a UMTS terrestrial radio access network UTRAN and a user equipment Ue. The interface between CN and UTRAN is called Iu, and the air interface between UTRAN and Ue is called Uu.

UTRAN consists of radio network subsystems RNS. The interface between RNSs is called Iur. RNS consists of a radio network controller RNC and one or more nodes B. The interface between RNC and B is called Iub. The coverage area of node B, i.e. a cell, is indicated in the figure by C.

Figure 2:
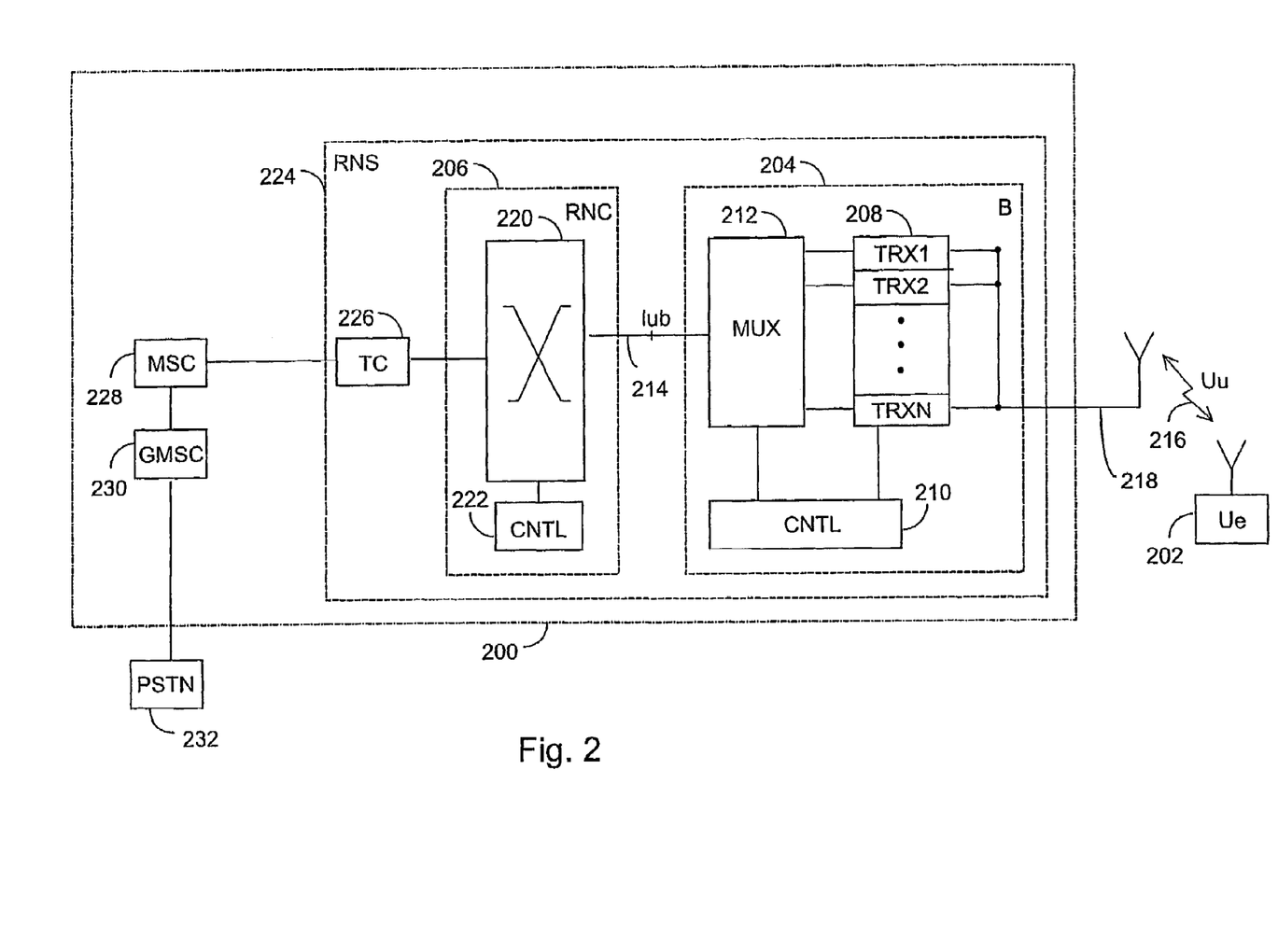
FIG. 2 is another example of a telecommunications system.

The description in FIG. 1 is rather general in nature, and therefore FIG. 2 gives a more detailed example of a cellular radio system. FIG. 2 only comprises the most essential blocks, but it is apparent to a person skilled in the art that a conventional cellular radio network also comprises other operations and structures, which need not be described in greater detail herein. The details of the cellular radio system may deviate from what is set forth in FIG. 2, but those differences are irrelevant to the invention.

Thus, the cellular radio network typically comprises a fixed network infrastructure, i.e. a network part 200 and subscriber terminals 202 that can be fixed, vehicle-mounted or portable, carry-around terminals, such as mobile stations or portable computers, which allow communication with a radio telecommunications system. The network part 200 comprises base stations 204. The base station corresponds to node B of the previous figure. A plurality of base stations 204 are, in turn, controlled in a centralized manner by a radio network controller 206 that communicates therewith. The base station 204 comprises transceivers 208 and a multiplexer unit 212.

The base station 204 further comprises a control unit 210, which controls the operation of the transceivers 208 and the multiplexer 212. The multiplexer 212 places the traffic and control channels used by a plurality of transceivers 208 to one transmission connection 214. The transmission connection 214 constitutes an interface Iub.

The transceivers 208 of the base station 204 communicate with an antenna unit 218 which implements a radio connection 216 to the subscriber terminal 202. The structure of frames to be transmitted over the radio connection 216 is defined system-specifically, and it is called an air interface Uu.

The radio network controller 206 comprises a group switching field 220 and a control unit 222. The group switching field 220 is used for switching speech and data and for connecting signalling circuits. A radio network subsystem 224 consisting of the base station 204 and the radio network controller 206 also comprises a transcoder 226. In general, the transcoder 226 is located as close to a mobile services switching centre 228 as possible, because speech can then be transmitted in cellular radio network format between the transcoder 226 and the radio network controller 206, and transmission capacity can be saved.

The transcoder 226 converts the different digital speech encoding modes used in the public switched telephone network and in the radio telephone network to be compatible. The control unit 222 performs call control, mobility management, collection of statistics and signalling.

FIG. 2 also shows a mobile services switching centre 228 and a gateway mobile services switching centre 230, which takes care of the connections outside the mobile system, in this case to the public switched telephone network 232.

Figure 3:
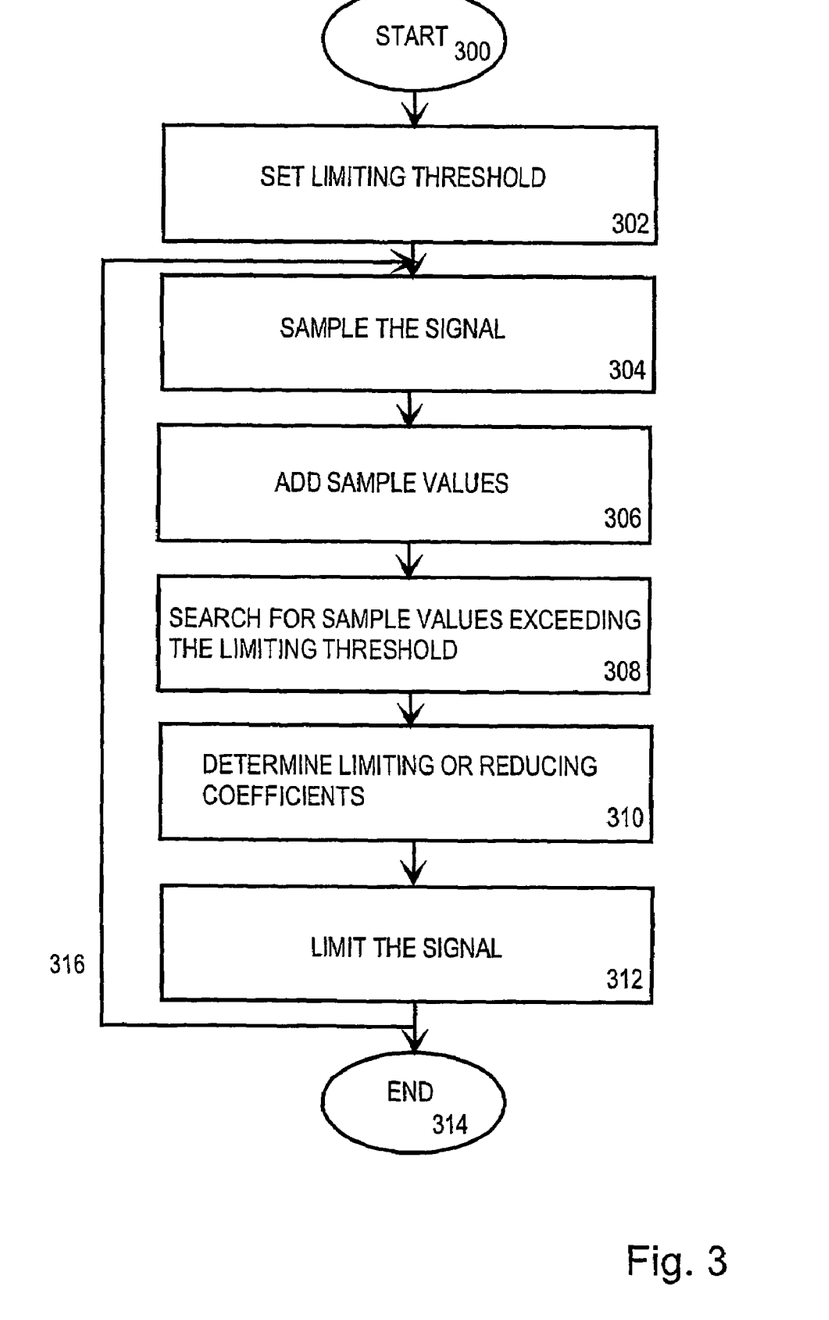
FIG. 3 is a flow chart of method steps for limiting a signal.

FIG. 3 is a flow chart of method steps for limiting a signal. Execution of the method starts in block 300. In block 302, the signal is given a threshold value, which in the present document is called a limiting threshold. Advantageously, the limiting threshold is set either for amplitude values or for power values. The requirements of the data transmission system employed as well as the required transmission power and the allowed maximum value of error vector magnitude (EVM) or the maximum value of peak code domain error, used in UMTS systems and describing the greatest allowed code error, are typically taken into account in setting the limiting threshold. Also other factors can be taken into account in setting the limiting threshold.

Figures 4, 5, 10:
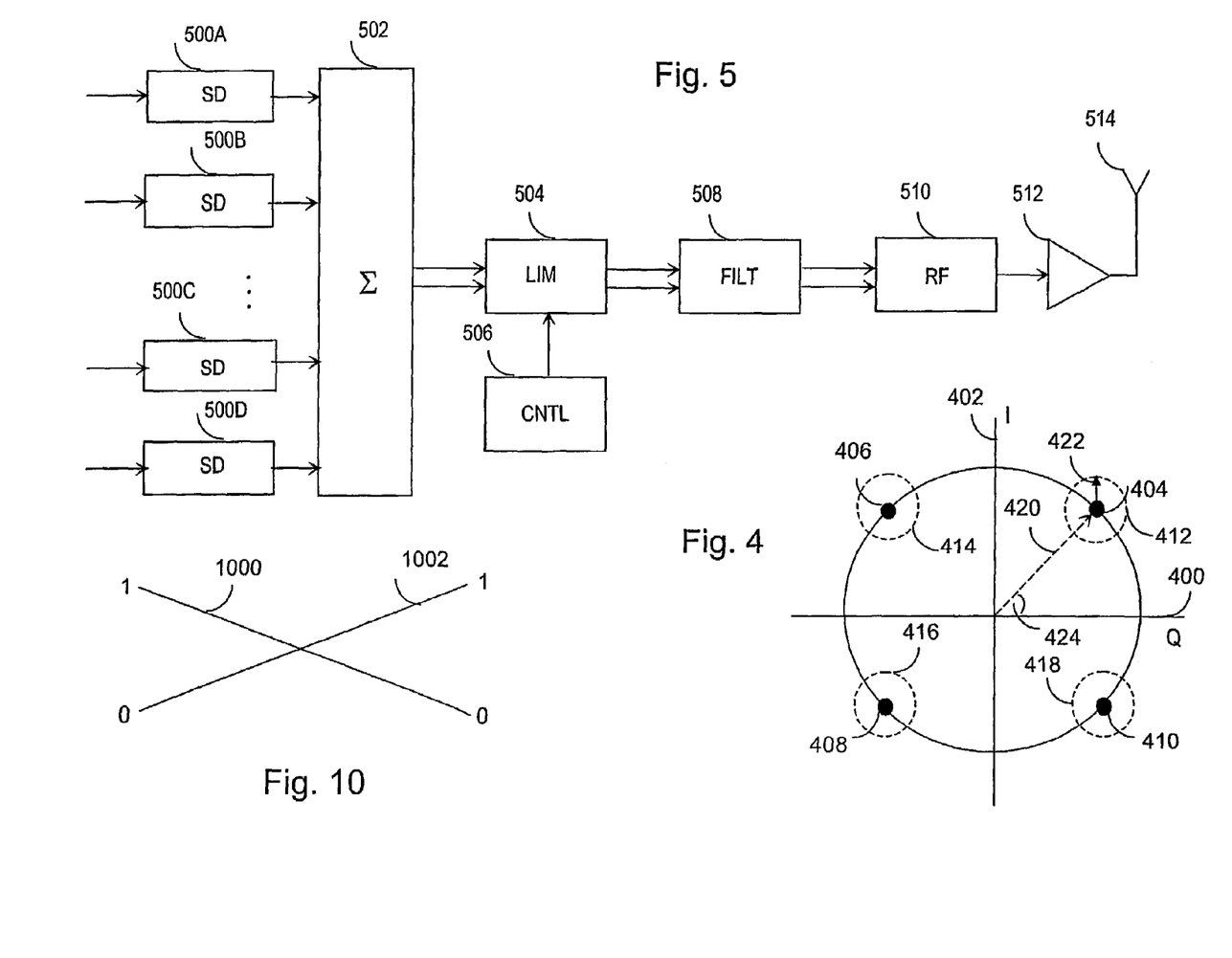
FIG. 4 illustrates error vector determination.
FIG. 5 shows a first example of a transmitter structure in block diagram.
FIG. 10 is an example illustrating how limiting coefficients or reducing coefficients are weighted.

Next, determination of the error vector magnitude is described by means of FIG. 4. FIG. 4 shows a simple example of a signal space diagram, by which it is possible to illustrate mutual location of modulated symbols. The example shows a two-dimensional signal space diagram of a phase-modulated signal, when the modulation has four levels. The system thus uses four different signals or pulse formats. In the example of FIG. 4 points 404, 406, 408, 410 represent different signals, i.e. states of the signal space diagram. In different states 404, 406, 408, 410 of the signal space diagram the signal will have different phase differences. The number of states in the signal space diagram varies depending on the modulation method: the more states, the better data transmission capacity in the system. The signal space diagram can be presented as a unit circle, as in FIG. 4, but there are also other manners of representation.

In the figure, a quadrature component of the modulated signal appears on the horizontal axis 400 and an in-phase component appears on the vertical axis 402. The modulation method in question is thus one, where the signal is divided into in-phase and quadrature components.

Circles 412, 414, 416, 418 depict an area, where the signals representing different symbols actually are due to various interferences. The signal space diagram is formed in such a manner that pointer diagrams of different signals having specific phase differences are shown in the same figure. FIG. 4 shows one pointer diagram 420, which represents the amplitude of one signal. Angle 424 depicts the phase difference of the signal. The pointer diagram as shown is for signal $A \cos(2\pi f_0 t + \phi)$, where A is the amplitude, $f_0$ is medium frequency, t is time and $\phi$ is phase difference of the signal.

The arrow 422 depicts a vector, which represents distance between the location of a noise-free symbol and the actual location of the symbol. In the example of the figure, interference has been summed to the modulated signal. The vector 422 is called an error vector (EVM). The error vector is one of the prior art quality indicators of modulation.

In block 304, the signal is sampled at least twice for obtaining sample values. The sampling methods are commonly known in the field, so there is no need to describe the sampling in greater detail herein.

Next, in block 306 one or more sample values are added between the obtained first and at least one subsequent sample values. Thus, sample values are added between one or more signal samples taken in block 304. The sample values are advantageously added by any of the several interpolation methods known in the field. Depending on the application, one or more sample values are added. The sample values are either digital samples or chips, depending on whether a narrow band signal or a wide band signal is sampled.

In block 308, sample values exceeding the limiting threshold are searched for. Values exceeding the limiting threshold are searched either in one-carrier signal or a composite signal that is obtained by combining a plurality of one-carrier signals. In addition, it is possible to take into account phases, if known, of different signals constituting the composite signal. The amplitude or power values can then be determined more accurately, because it is possible to take into account the interaction of the signals. It is known that the signals in the same phase amplify one another and those in different phases cancel one another.

Figures 6, 9:
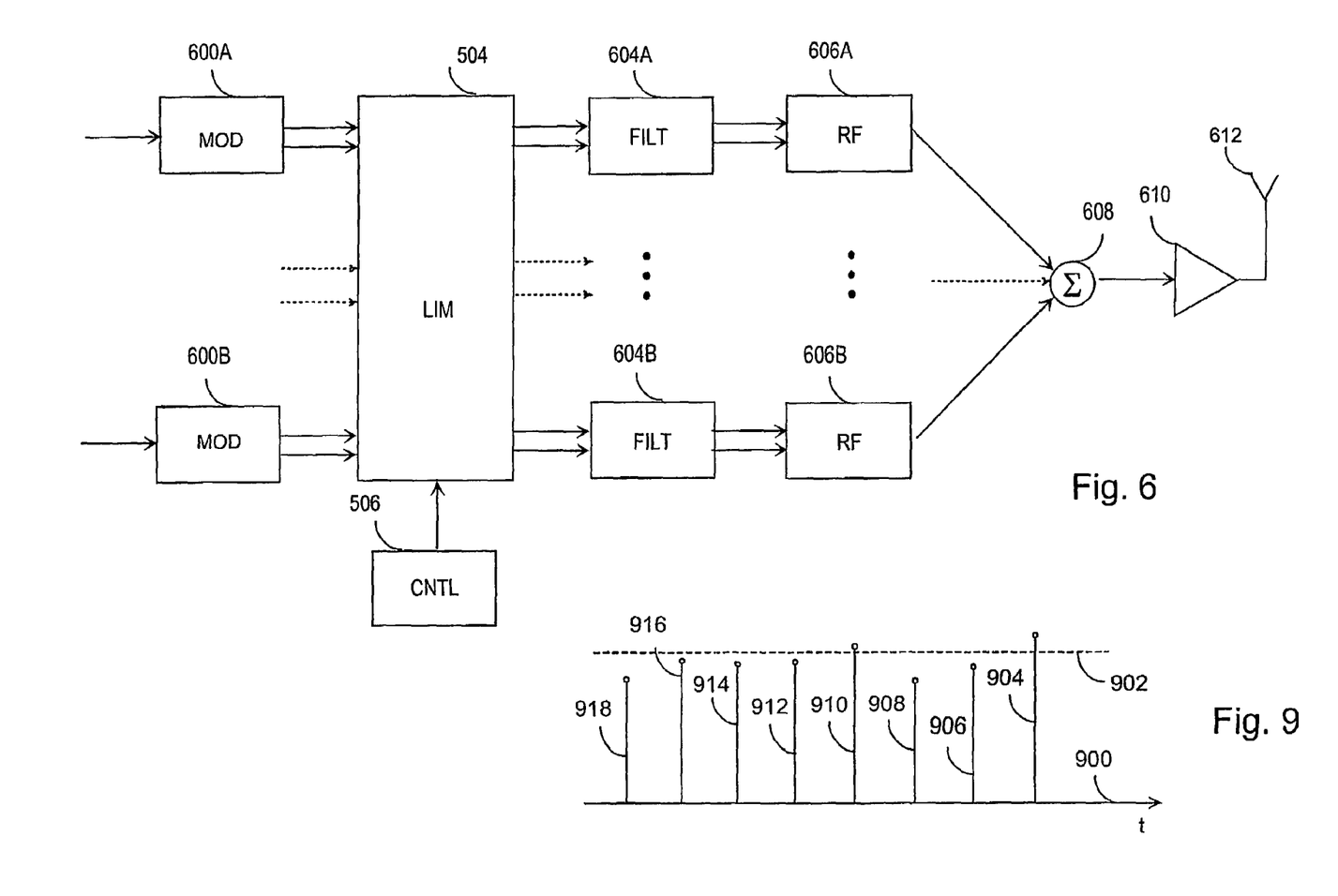
FIG. 6 shows a second example of a transmitter structure in block diagram.
FIG. 9 is an example illustrating how sample values are added.

Next, the example of FIG. 9 is used for describing how samples are added and values exceeding the limiting threshold are searched for. In FIG. 9, an arrow 900 represents a time line section and a broken line 902 represents the limiting threshold. Determination conditions for the limiting threshold have been described above. In the example of FIG. 9, samples 904 and 914 are those obtained by sampling the actual signal. Four new samples 906, 908, 910, 912 have been interpolated between the sample 1, 904 and sample 2, 914. There are several known interpolation methods and selection of the method to be used depends on the system, so the interpolation methods are not described here in greater detail. At its simplest, interpolation is performed such that the generated samples follow the shape of a descriptor, such as a straight line. Samples 916, 918 represent those interpolated between the actual samples 2, 914 and 3 (not shown in the figure) and illustrate how the method proceeds on time level. It appears from the figure that samples 904 and 910 exceed the threshold, and consequently the samples will be limited with a suitable coefficient.

By adding samples in the manner shown in FIG. 9 it is also possible to model a transmitter frequency response. Coefficients of an interpolating filter can also be adjusted during transmission, when the transmitter response changes as temperature changes, for instance.

Next, in block 310 limiting coefficients or reducing coefficients are determined for a predetermined number of sample values by means of at least one sample value exceeding the limiting threshold. The coefficients can be determined for all sample values or for some of them only, advantageously for the sample values exceeding the limiting threshold.

FIG. 10 illustrates one manner to determine the weighting of the coefficients. FIG. 10 shows a simplified example of a linear weighting method. In the example, limiting coefficients and reducing coefficients are determined for two successive samples. The straight line 1000 represents the weighting of the limiting coefficient or the reducing coefficient of the first sample and the straight line 1002 represents the weighting of the limiting coefficient or the reducing coefficient of the second sample. The location of the power or amplitude peaks to be clipped can be taken into account by the weighting of the coefficients. For instance, if the sample to be limited is located at the second original sample, only said sample is limited, and consequently the limiting coefficient or the reducing coefficient of the sample to be clipped is weighted by one and the limiting coefficient or the reducing coefficient of the second sample is weighted by zero, whereby the weighting coefficient is zero. Or, if the sample to be clipped is halfway between the original samples, both samples can be limited equally, whereby the same limiting coefficient or reducing coefficient is typically selected for both samples, and both coefficients are weighted by 0.5. It is to be noted that there are also other weighting methods than the linear method described above, and the selection of the weighting method depends on the application. It is also possible to leave the limiting coefficients and the reducing coefficients unweighted.

The limiting coefficient or the reducing coefficient depends on the desired signal level, i.e. on the limiting threshold and the power or amplitude of the signal sample. For instance, if the chip amplitude is 1, and it is necessary to make it read 0.8, limitation can be performed by multiplying the signal sample by a limiting coefficient 0.8 or by subtracting a reducing coefficient 0.2, which is typically determined by means of the limiting coefficient, from the signal sample. Also other possible requirements of the system are taken into account in the selection of limiting coefficients and reducing coefficients. Typically the limiting coefficient (or reducing coefficient) is determined by means of a limiting threshold, i.e. the signal peak is simply clipped by means of the coefficient such that it remains below the selected threshold value.

In block 312 the signal is limited with one or more limiting coefficients, a weighted limiting coefficient, a reducing coefficient or a weighted reducing coefficient. The signal is limited either by multiplying a predetermined number of sample values by one or more limiting coefficients determined in block 310 or by subtracting from the signal a limiting coefficient, or typically, a reducing coefficient determined by means of the limiting coefficient. It is also possible to determine suitable weighting for the limiting coefficients and/or the reducing coefficients, as described above. It should be noted that interaction caused by limitation of several power or amplitude values can be taken into account when the power and amplitude values are limited, for instance such that changes in the signal caused by the limitation will be reduced by suitably determining limiting coefficients, reducing coefficients or the weighting thereof.

The execution of the method ends in block 314. Arrow 316 represents one option to repeat the above-described method.

Next, the example of FIG. 5 is used for describing, in block diagram, a part of one transmitter, to which the above method can be applied. It is apparent to a person skilled in the art that the transmitter also comprises other parts than those shown in FIG. 5. These parts include, for instance, a digital signal processor. The exemplary transmitter of FIG. 5 is a multi-carrier transmitter. The transmitter can also be a one-carrier transmitter. It should be noted that, unlike in the figure, the radio parts of the transmitter and the receiver can also be combined. The double arrows between blocks 502 and 504, 504 and 508 as well as 508 and 510 depict the signal as a complex signal on I (in-phase) and Q (quadrature) levels. Depending on the system, the signal can also be presented in some other manner.

FIG. 5 shows a multi-carrier transmitter, which employs four different carriers. However, the number of carriers employed, and hence the number of spreading blocks 500A to 500D, varies depending on the application. A data signal, which is typically processed in various ways, for instance coded, in a signal processor, is applied to the spreading blocks 500A to 500D. In the spreading blocks 500A to 500D the narrow band data signals modulated onto the carriers are multiplied by a spreading code for spreading the band. For instance, the UMTS system is such a wide band system. If a narrow band system is concerned, the spreading of the band is omitted. A narrow band signal can also be changed into a wide band signal, for instance into a spread spectrum signal, in any other prior art method than the direct sequence (DS) method.

Next the signals are applied to an adder 502, where a composite signal is formed from the different signals. If the data transmission system employs a modulation method, in which the signal is divided into in-phase and quadrature components, there are two adders, whereby the in-phase and the quadrature components are summed separately. However, in the figure the adder is shown as one block.

The composite signal is applied to a limiter, where the power and amplitude values of the signal are limited in the above-described manner. An example of the structure of the limiter will be described later in the text by means of FIGS. 7, 8, 11 and 12. If the signal was not sampled at the limiter input, the signal is sampled in the limiter. Block 506 is a control block, which controls the operation of the limiter 504, for instance, determines a clipping threshold, which in the present document is called a limiting threshold. The requirements of the data transmission system employed as well as the required transmission power and the allowed maximum value of error vector magnitude (EVM) or the maximum value of peak code domain error, used in UMTS systems and describing the greatest allowed code error, are typically taken into account in setting the limiting threshold. Also other factors can be taken into account in setting the limiting threshold. The control block 506 may also control the operation of other blocks.

The signal is next applied to an interpolating filter 508 in order that sampling frequency could be kept lower in the above-described operational blocks of the transmitter than what the operation of the system would filter adds sample values to the signal, in addition to actual values. The interpolating filter can be implemented by any prior art method.

Next, the signal is converted from digital to analogue (not shown in the figure) with a D/A converter. In RF parts 510 the signal is upmixed onto a selected transmission frequency, either directly or by mixing the signal first onto an intermediate frequency. The signal is amplified with a power amplifier 512 and filtered, if necessary. The antenna 514 can be a single antenna or an antenna array consisting of a plurality of antenna elements. If the transmitter and the receiver have the same antenna, a duplex filter is required to separate the transmitted signal from the received signal.

FIG. 6 shows a second example, in block diagram, of a transmitter part, to which the above-described method can be applied. In the example of FIG. 6, different carrier signals are not summed until prior to a power amplifier. It is apparent to a person skilled in the art that the transmitter also comprises other parts than those shown in FIG. 6. These parts include a digital signal processor, for instance. The exemplary transmitter of FIG. 6 is a multi-carrier transmitter. The transmitter may also be a one-carrier transmitter. The number of modulators 600A-B, filters 604A-B and radio frequency parts 606A-B vary depending on the number of carriers. It should be noted that, unlike in the figure, the radio frequency parts of the transmitter and the receiver may also be combined.

In blocks 600A-B the signal is modulated according to any known modulation method. In FIG. 6, the double arrows between blocks 600A-B and 504, 504 and 604A as well as 604A-B and 606A-B depict the signal as a complex signal on I and Q levels, i.e. by means of in-phase and quadrature components. The signal is thus converted into this representation format by modulation. The modulation method can also be such that the signal is represented real.

To the limiter 504 is applied a data signal, on which digital signal processing operations, such as coding, have been performed, or they are combined in the same processor with the limiter. In that case, the modulation is not performed until after the digital signal processing. If wide band data transmission is concerned, the spectrum of the data signal is spread, for instance, by multiplying by a spreading code prior to the limitation of the power or amplitude values.

In the limiter 504 the power and amplitude values of the signal are limited in the above-described manner. The structure of the limiter will be described later on in the text by means of the examples of FIGS. 7, 8, 11 and 12. If the signal was not sampled at the limiter input, the signal is sampled in the limiter. Block 506 is a control block, which controls the operation of the limiter 504, for instance, determines a clipping threshold, which in the present document is called a limiting threshold. The requirements of the data transmission system employed as well as the required transmission power and the allowed maximum value of error vector magnitude (EVM) or the maximum value of peak code domain error, used in UMTS systems and describing the greatest allowed code error, are typically taken into account in setting the limiting threshold. Also other factors can be taken into account in setting the limiting threshold. The control block 506 may also control the operation of other blocks.

From the limiter the signal is applied to a transmitter filter 604A-B. The transmitter filter 604A-B determines the bandwidth and waveform of the transmitted signal. The spectrum of the transmitted signal is thus determined after the limiter 504.

Next, the signal is converted from digital to analogue (not shown in the figure) with a D/A converter. In RF parts 606A-B the signal is upmixed onto a desired transmission frequency, either directly or by mixing the signal first onto an intermediate frequency, and filtered, if necessary. The different carrier signals are combined in an adder 606 into a composite signal that will be applied to a power amplifier 608. If the modulation method divides the signal into in-phase and quadrature components, each signal component requires a separate adder, whereby there are two adders. It should be noted that the adder 608 can be arranged in various places after the filter 604.

The antenna 610 can be a single antenna or an antenna array consisting of a plurality of antenna elements. If the transmitter and the receiver have the same antenna, a duplex filter is required to separate the transmitted signal from the received signal.

Figure 7:
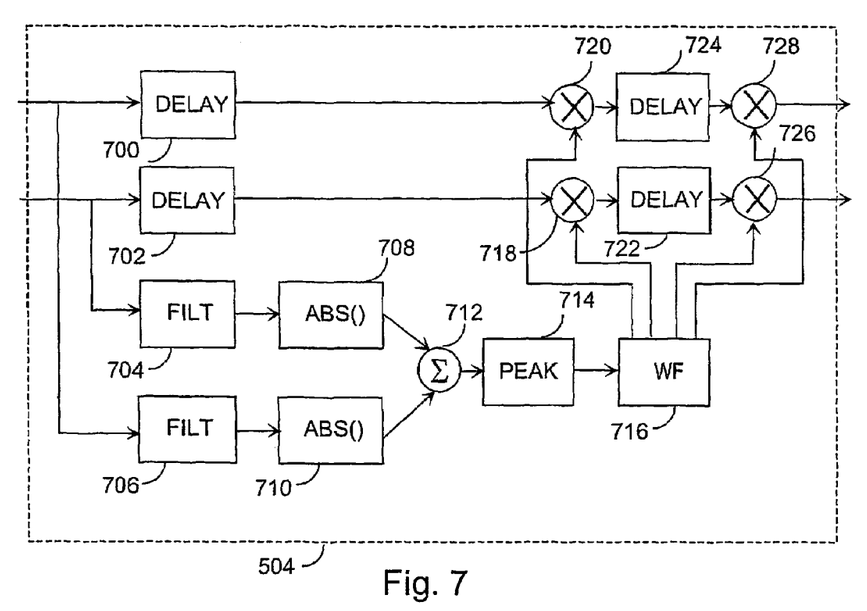
FIG. 7 shows a first example of the structure of a limiter in block diagram.

In FIG. 7, a block diagram depicts an example of the limiter structure. The limiter structure of the figure can be employed when the phase of the processed signal is not known or there is only one signal to be processed, when the phase difference is irrelevant to limitation. In the example of FIG. 7, two different signals or an in-phase and quadrature component pair of one signal enter the limiter. The number of signals may vary depending on the application. The signals are applied to delay elements 700, 702 and interpolation filters 704, 706. The interpolation filters add sample values in addition to real samples. The response of the interpolation filter is also adaptable to the transmitter characteristics either by means of software or manually. Interpolation can be implemented in any known manner. Next, in blocks 708, 710 the amplitude or power values of each sample is determined, whereafter the determined values are summed with the adder 712, and a discrete signal consisting of amplitude and power values is thus obtained.

In block 714, values exceeding the set limiting threshold are searched for. It is described next by means of the example of FIG. 9 how the samples are added and the values exceeding the limiting threshold are searched for. FIG. 9 shows a time line section 900 and a limiting threshold 902, the determination conditions of which are described above. In the example of FIG. 9, samples 904 and 914 are actual samples taken from the signal. Four new samples 906, 908, 910, 912 have been interpolated between the sample 1, 904 and the sample 2, 914. There are several known interpolation methods, and the selection of the method to be used is system-dependent, so the interpolation methods are not described here in greater detail. The samples 916, 918 represent samples interpolated between the actual samples 2 and 3, and they illustrate how the execution of the method proceeds on time level. It appears from the figure that the samples 904 and 910 exceed the threshold, so the original samples are scaled downwardly in order for the interpolated samples not to exceed the limiting threshold.

Next, in block 716 a limiting coefficient or coefficients is/are determined for the samples to be limited. FIG. 10 illustrates one manner to determine suitable weights for the limiting coefficients. FIG. 10 shows a simplified example of a linear weight determination method. In the example, limiting coefficients are determined for two samples. The straight line 1000 depicts the limiting coefficient weighting of the first sample and the straight line 1002 depicts the limiting coefficient weighting of the second sample. The location of the power or amplitude peaks to be clipped can be considered by the weighting of the coefficients. For instance, if the sample to be limited is located at the second original sample, only said sample is limited, and consequently the limiting coefficient of the sample to be clipped is weighted by one and the limiting coefficient of the second sample is weighted by zero, whereby the weighting coefficient is zero. Or, if the sample to be clipped is halfway between the original samples, both samples can be limited equally, whereby the same limiting coefficient is typically selected for both samples, and both coefficients are weighted by 0.5. It should be noted that there are also other weighting methods than the linear method described above, and the selection of the weighting method depends on the application. It is also possible to leave the limiting coefficients unweighted.

The limiting coefficient depends on the desired signal level, i.e. on the limiting threshold and the power or amplitude of the signal sample. For instance, if the chip amplitude is 1, and it is necessary to make it read 0.8, limitation can be performed by multiplying the signal sample by a limiting coefficient 0.8 or by subtracting a reducing coefficient 0.2, which is typically determined by means of a limiting coefficient, from the signal sample. Also other possible requirements of the system are taken into account in the selection of limiting coefficients and reducing coefficients.

Next, the samples delayed in the delay elements 700, 702 are multiplied by the determined limiting coefficients in multipliers 718, 720. The delay is determined on the basis of how long it takes to determine a limiting coefficient in order for each sample to be multiplied by a correct limiting coefficient. Thereafter the samples are further delayed in second delay elements 722, 724, in order for the sample taken at a previous time instant can be multiplied by a correct limiting coefficient in multipliers 726, 728.

The above description relates to the structure of a limiter, in which two successive samples are observed at a time. However, there may be a plurality of samples, their number depending on the application. However, it should be noted that the more samples to be observed at a time, the more delay in the system, so in practice, the number of samples to be processed at a time is rather small. The number of samples to be processed at a time affects the limiter structure: for instance, if there are three samples, one more set of delay elements and multipliers is added to the limiter of the example of FIG. 7.

Figure 8:
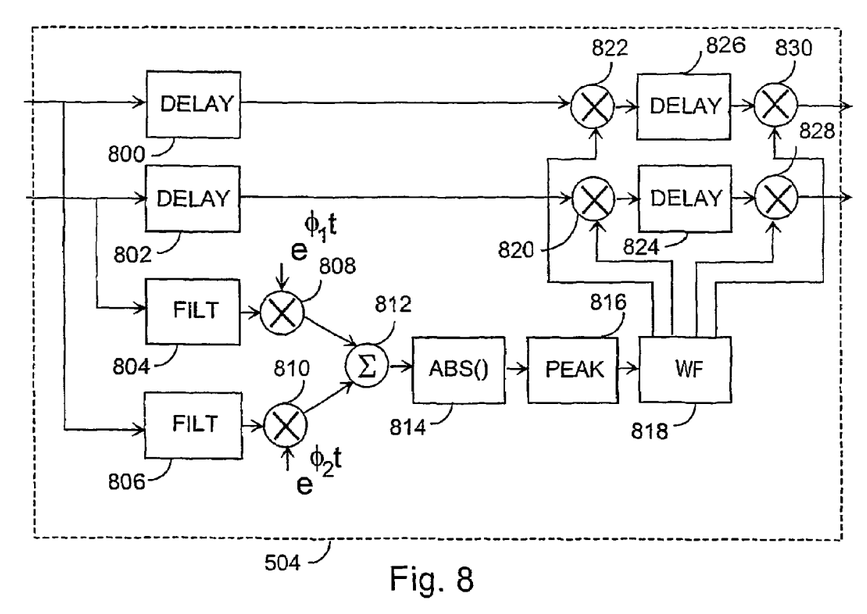
FIG. 8 shows a second example of the structure of a limiter in block diagram.

FIG. 8 shows a second example of the limiter structure in block diagram. The limiter structure of the figure can be employed when the phases of the different signals constituting the composite signal to be processed are known. When the phases of the different signals of the composite signal are known, it is possible to determine the amplitude and power values more accurately, because the interaction of the signals can be taken into account (signals in the same phase amplify one another and signals in different phases cancel one another). The number of the signals may vary depending on the application. The signals are applied to delay elements 800, 802 and interpolation filters 804, 806. The interpolation filters add sample values, in addition to the real values. The interpolation filters can be implemented in any prior art manner.

Next, the signals are applied to multipliers 808, 810, where the signals are multiplied by a known phase factor. Thereafter the signals are applied to an adder 812, where a composite signal is formed. In block 814, the amplitude and power values of the composite signal are determined. In block 816, values exceeding the set limiting threshold are searched for in the manner described in connection with FIG. 7.

In block 818, a limiting coefficient or coefficients are determined for the samples to be limited in the manner described in connection with FIG. 7.

Next, the samples delayed in the delay elements 800, 802 are multiplied by limiting coefficients in multipliers 820, 822. The delay is determined on the basis of how long it takes to determine a limiting coefficient in order for each sample to be multiplied by a correct limiting coefficient. Thereafter the samples are further delayed in second delay elements 824, 826 in order for the sample taken at a previous time instant can be multiplied by a correct limiting coefficient in multipliers 828, 830.

The above description relates to the structure of a limiter, in which two successive samples are observed at a time. However, there may be a plurality of samples, their number depending on the application. However, it should be noted that the more samples to be observed at a time, the more delay in the system, so in practice, the number of samples to be processed at a time is rather small. The number of samples to be processed at a time affects the structure of the limiter: for instance, if there are three samples, one more set of delay elements and multipliers is added to the limiter of the example of FIG. 8.

Figure 11:
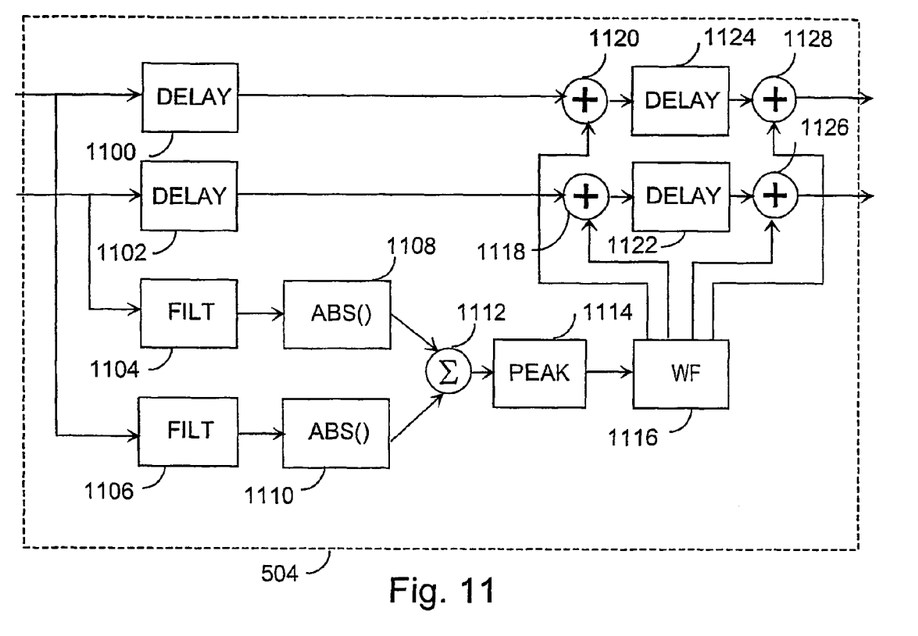
FIG. 11 shows a third example of the structure of a limiter in block diagram.

FIG. 11 shows a third example of the structure of a limiter in block diagram. The limiter of FIG. 11 is used when the signal is limited by subtracting suitable coefficients therefrom. The limiter structure of the figure can be used when the signal phase is not known or there is only one signal to be processed, whereby the phase difference is irrelevant to the limitation. In the example of FIG. 11, two different signals or an in-phase and quadrature component pair of one signal enter the limiter. The number of signals may vary depending on the application. The signals are applied to delay elements 1100, 1102 and interpolation filters 1104, 1106. The interpolation filters add sample values in addition to real samples. The response of the interpolation filter can also be adaptable to the transmitter characteristics either by means of software or manually. Interpolation can be implemented in any known manner. Next, in blocks 1108, 1110 the amplitude or power values of each sample is determined, whereafter the determined values are summed with the adder 1112, and a discrete signal consisting of amplitude and power values is thus obtained.

In block 1114, values that exceed the set limiting threshold are searched for. How samples are added and values exceeding the limiting threshold are searched for is described above in connection with the example of FIG. 9.

Next, in block 1116 a limiting coefficient, a reducing coefficient or coefficients are determined for the samples to be limited. FIG. 10 illustrates one manner to determine suitable weights for the limiting coefficients or reducing coefficients. FIG. 10 has been described in greater detail above.

Next, the determined limiting coefficients or reducing coefficients are subtracted in the adder 1118, 1120 from the samples delayed in the delay elements 1100, 1102. The delay is determined on the basis of how long it takes to determine a limiting coefficient in order for each sample to be multiplied by a correct limiting coefficient. Thereafter the samples are further delayed in second delay elements 1122, 1124, in order that the determined coefficient can be subtracted from the sample taken at a previous time instant in the adders 1126, 1128.

The above description relates to the structure of a limiter, in which two successive samples are observed at a time. However, there may be a plurality of samples, their number depending on the application. However, it should be noted that the more samples to be observed at a time, the more delay in the system, so in practice, the number of samples to be processed at a time is rather small. The number of samples to be processed at a time affects the structure of the limiter: for instance, if there are three samples, one more set of delay elements and multipliers is added to the limiter of the example of FIG. 11.

Figure 12:
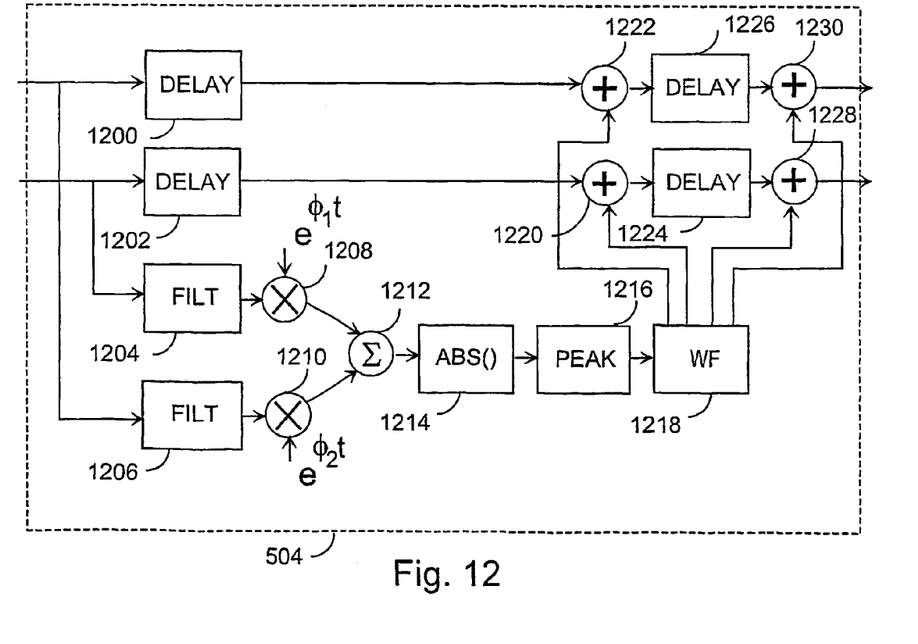
FIG. 12 shows a fourth example of the structure of a limiter in block diagram.

FIG. 12 shows a fourth example of the limiter structure in block diagram. The limiter of FIG. 12 can be employed when the signal is limited by subtracting suitable coefficients therefrom. The limiter structure of the figure can be employed when the phases of the different signals constituting the composite signal to be processed are known. When the phases of the different signals of the composite signal are known, it is possible to determine the amplitude and power values more accurately, because the interaction of the signals can be taken into account (signals in the same phase amplify one another and signals in different phases cancel one another). The number of the signals may vary depending on the application. The signals are applied to delay elements 1200, 1202 and interpolation filters 1204, 1206. In the interpolation filters sample values are added, in addition to the real values. The interpolation filters can be implemented in any prior art manner.

Next, the signals are applied to multipliers 1208, 1210, where the signals are multiplied by a known phase factor. Thereafter the signals are applied to an adder 1212, where a composite signal is formed. In block 1214, the amplitude and power values of the composite signal are determined. In block 1216, values exceeding the set limiting threshold are searched for in the manner described in connection with FIG. 7.

In block 1218, a limiting coefficient, a reducing coefficient or coefficients are determined for the samples to be limited in the manner described in connection with FIG. 7.

Next, the determined coefficients (either limiting coefficients or reducing coefficients) are subtracted in the adders 1220, 1222 from the samples delayed in the delay elements 1200, 1202. The delay is determined on the basis of how long it takes to determine a limiting coefficient in order for each sample to be multiplied by a correct limiting coefficient. Thereafter the samples are further delayed in second delay elements 824, 826 in order that the determined coefficient can be subtracted from the sample taken at a previous time instant in the adders 1228, 1230.

The above description relates to the structure of a limiter, in which two successive samples are observed at a time. However, there may be a plurality of samples, their number depending on the application. However, it should be noted that the more samples to be observed at a time, the more delay in the system, so in practice, the number of samples to be processed at a time is rather small. The number of samples to be processed at a time affects the structure of the limiter: for instance, if there are three samples, one more set of delay elements and multipliers are added to the limiter of the example of FIG. 12.

Even though the invention is described above with reference to the attached drawings, it is apparent that the invention is not restricted thereto, but it may be modified in a variety of ways within the scope of the inventive idea disclosed in the attached claims.

The invention claimed is:

1. A method comprising:
    giving a signal a limiting threshold;
    taking at least two samples from the signal for obtaining sample values;
    adding one or more sample value between the obtained first and at least one subsequent sample value,
    searching for sample values exceeding the limiting threshold; and
    when at least one sample value exceeding the limiting threshold is found,
        determining limiting coefficients or reducing coefficients for a predetermined number of sample values by means of the at least one sample value exceeding the limiting threshold, and
        limiting the signal by means of one or more determined coefficients.

2. The method as claimed in claim 1, wherein the adding the one or more sample value comprises adding by interpolation.

3. The method as claimed in claim 1, wherein the adding the one or or more sample value comprises interpolating using an interpolating filter adaptable to the characteristics of a transmitter.

4. The method as claimed in claim 1, further comprising:
    wherein the limiting coefficients and the reducing coefficients.

5. The method as claimed in claim 1, further comprising:
    wherein the limiting coefficients and the reducing coefficients; and
    determining the weighting by a linear method.

6. The method as claimed in claim 1, further comprising:
    configuring the sample values to be digital samples.

7. The method as claimed in claim 1, further comprising:
    configuring the sample values to be chips.

8. The method as claimed in claim 1, further comprising:
    determining the limiting coefficients and the reducing coefficients for all sample values.

9. The method as claimed in claim 1, further comprising:
    determining the limiting coefficients or the reducing coefficients for sample values exceeding the limiting threshold.

10. The method as claimed in claim 1, further comprising:
    searching the values exceeding the limiting threshold in a composite signal, which is formed by combining a plurality of one-carrier signals.

11. The method as claimed in claim 1, further comprising:
    searching the values exceeding the limiting threshold in a composite signal, which is formed by combining a plurality of one-carrier signals, the phases of the signals that constitute said composite signal being at least substantially known.

12. The method as claimed in claim 1, further comprising: searching the values exceeding the limiting threshold in a one-carrier signal.

13. The method as claimed in claim 1, further comprising: setting the limiting threshold for power values.

14. The method as claimed in claim 1, further comprising: setting the limiting threshold for amplitude values.

15. The method as claimed in claim 1, further comprising: setting the limiting threshold taking into account a predetermined maximum value of error vector magnitude.

16. The method as claimed in claim 1, further comprising: setting the limiting threshold taking into account a predetermined maximum value of a peak code domain error.

17. The method as claimed in claim 1, further comprising: taking into account interaction caused by limitation of a plurality of power and amplitude values.

18. The method as claimed in claim 1, further comprising: limiting the signal by multiplying a predetermined number of samples by one or more limiting coefficients.

19. The method as claimed in claim 1, further comprising: determining reducing coefficients using the limiting coefficients.

20. The method as claimed in claim 1, further comprising: limiting the signal by subtracting the selected limiting coefficient or reducing coefficient from the predetermined samples.

21. An arrangement, comprising:
a threshold unit configured to give the signal a limiting threshold;
a sampler unit configured to sample the signal at least twice to obtain sample values;
an adder unit configured to add one or more sample value between the obtained first and at least one subsequent sample value,
a searcher unit configured to search for sample values exceeding the limiting threshold;
a determiner unit configured to determine limiting coefficients or reducing coefficients for a predetermined number of sample values using the at least one sample value exceeding the limiting threshold; and
a limiter unit configured to limit the signal using one or more determined coefficients.

22. The arrangement as claimed in claim 21, wherein the arrangement is configured to add sample values by interpolation.

23. The arrangement as claimed in claim 21, wherein limiting coefficients or reducing coefficients are weighted.

24. The arrangement as claimed in claim 21, wherein limiting coefficients or reducing coefficients are weighted and the arrangement is configured to determine the weighting by a linear method.

25. The arrangement as claimed in claim 21, wherein the sample values are digital samples.

26. The arrangement as claimed in claim 21, wherein the sample values are chips.

27. The arrangement as claimed in claim 21, wherein the arrangement is configured to determine the limiting coefficients or the reducing coefficients for all sample values.

28. The arrangement as claimed in claim 21, wherein the arrangement is configured to determine the limiting coefficients or the reducing coefficients for samples values exceeding the limiting threshold.

29. The arrangement as claimed in claim 21, wherein the arrangement is configured to search the values exceeding the limiting threshold in the composite signal, which is formed by combining a plurality of one-carrier signals.

30. The arrangement as claimed in claim 21, wherein the arrangement is configured to search the values exceeding the limiting threshold in the composite signal, which is formed by combining a plurality of one-carrier signals and the phases of the different signals constituting said composite signal are at least substantially known.

31. The arrangement as claimed in claim 21, wherein the arrangement is configured to search the values exceeding the limiting threshold in a one-carrier signal.

32. The arrangement as claimed in claim 21, wherein the arrangement is configured to set the limiting threshold is set for the power values.

33. The arrangement as claimed in claim 21, wherein the arrangement is configured to set the limiting threshold for the amplitude values.

34. The arrangement as claimed in claim 21, wherein the arrangement is configured to set the limiting threshold taking into account the predetermined maximum value of error vector magnitude.

35. The arrangement as claimed in claim 21, wherein the arrangement is configured to set the limiting threshold taking into account a predetermined maximum value of a peak code domain error.

36. The arrangement as claimed in claim 21, wherein the arrangement comprises an interpolation filter, whose response is configured to be adapted to the characteristics of a transmitter.

37. The arrangement as claimed in claim 21, wherein the arrangement is configured to take into account interaction caused by limitation of a plurality of power and amplitude values.

38. The arrangement as claimed in claim 21, wherein the arrangement is configured to limit the signal by multiplying a predetermined number of samples by one or more limiting coefficients.

39. The arrangement as claimed in claim 21, wherein the arrangement is configured to determine reducing coefficients are determined by means of the limiting coefficients.

40. The arrangement as claimed in claim 21, wherein the arrangement is configured to limit the signal by subtracting the selected limiting coefficient or reducing coefficient from the predetermined samples.

41. An arrangement, comprising:
threshold means for giving the signal a limiting threshold;
sampler means for sampling the signal at least twice for obtaining sample values;
adder means for adding one or more sample values between the obtained first and at least one subsequent sample value;
searcher means for searching for sample values exceeding the limiting threshold;
determiner means for determining limiting coefficients or reducing coefficients for a predetermined number of sample values using the at least one sample value exceeding the limiting threshold; and
limiter means for limiting the signal using one or more determined coefficients.

* * * * *